United States Patent
Burch et al.

(10) Patent No.: US 9,298,488 B2
(45) Date of Patent: *Mar. 29, 2016

(54) TECHNIQUES FOR DYNAMIC DISK PERSONALIZATION

(71) Applicant: Novell, Inc., Provo, UT (US)

(72) Inventors: Lloyd Leon Burch, Payson, UT (US); Jason Allen Sabin, Lehi, UT (US); Kal A. Larsen, Springville, UT (US); Nathaniel Brent Kranendonk, Springville, UT (US); Michael John Jorgensen, Mapleton, UT (US)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,001

(22) Filed: Sep. 8, 2014

(65) Prior Publication Data

US 2014/0380316 A1    Dec. 25, 2014

Related U.S. Application Data

(63) Continuation of application No. 14/025,430, filed on Sep. 12, 2013, now Pat. No. 8,949,505, which is a continuation-in-part of application No. 13/400,224, filed on Feb. 20, 2012, now Pat. No. 8,539,136, which is a continuation-in-part of application No. 12/706,813, filed on Feb. 17, 2010, now Pat. No. 8,140,735.

(51) Int. Cl.
| | |
|---|---|
| *G06F 12/00* | (2006.01) |
| *G06F 9/455* | (2006.01) |
| *G06F 17/30* | (2006.01) |
| *G06F 12/10* | (2006.01) |

(52) U.S. Cl.
CPC .......... *G06F 9/45533* (2013.01); *G06F 9/455* (2013.01); *G06F 17/30067* (2013.01); *G06F 17/30129* (2013.01); *G06F 17/30174* (2013.01); *G06F 12/109* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,142,624 A | 8/1992 | Patrick, II |
| 6,385,606 B2 | 5/2002 | Inohara et al. |
| 6,766,454 B1 | 7/2004 | Riggins |
| 7,188,364 B2 | 3/2007 | Volpano |
| 7,533,110 B2 | 5/2009 | Kreiner et al. |
| 7,681,122 B1 | 3/2010 | Tsykora |
| 7,797,743 B2 | 9/2010 | Treacy et al. |
| 8,140,735 B2 | 3/2012 | Burch et al. |
| 8,539,136 B2 | 9/2013 | Burch et al. |

(Continued)

OTHER PUBLICATIONS

Web Performance monitor for zVM RTM/ESA, IBM 2003.*

(Continued)

*Primary Examiner* — Duc Doan
(74) *Attorney, Agent, or Firm* — Schwegman Lundberg & Woessner, P.A.

(57) ABSTRACT

Techniques for dynamic disk personalization are provided. A virtual image that is used to create an instance of a virtual machine (VM) is altered so that disk access operations are intercepted within the VM and redirected to a service that is external to the VM. The external service manages a personalized storage for a principal, the personalized storage used to personalize the virtual image without altering the virtual image.

19 Claims, 3 Drawing Sheets

(56) References Cited

U.S. PATENT DOCUMENTS

| | | |
|---|---|---|
| 8,812,766 B2 | 8/2014 | Kranendonk |
| 8,949,505 B2 | 2/2015 | Burch et al. |
| 2007/0156804 A1 | 7/2007 | Mo |
| 2007/0288228 A1 | 12/2007 | Taillefer et al. |
| 2008/0127348 A1* | 5/2008 | Largman et al. ........ 726/24 |
| 2008/0195760 A1 | 8/2008 | Nudler |
| 2008/0232295 A1 | 9/2008 | Kreiner et al. |
| 2009/0125902 A1* | 5/2009 | Ghosh et al. ........ 718/1 |
| 2009/0216908 A1 | 8/2009 | Moromisato et al. |
| 2009/0228654 A1 | 9/2009 | Lakowicz |
| 2009/0300149 A1* | 12/2009 | Ferris et al. ........ 709/222 |
| 2010/0036889 A1 | 2/2010 | Joshi et al. |
| 2010/0175064 A1* | 7/2010 | Brahmaroutu ........ 718/1 |
| 2010/0299371 A1 | 11/2010 | Little et al. |
| 2011/0191358 A1 | 8/2011 | Kuo et al. |
| 2011/0313982 A1 | 12/2011 | Kranendonk et al. |
| 2012/0151132 A1 | 6/2012 | Burch et al. |
| 2014/0019971 A1 | 1/2014 | Burch et al. |
| 2014/0359623 A1 | 12/2014 | Kranendonk et al. |

OTHER PUBLICATIONS

"3.1 Guidelines for Configuring and Using Dynamic Storage Technology", From Dynamic Storage Technology 1.0 Administration Guide, Novell Open Enterprise Server, Nov. 9, 2009, [Online] Retrieved from the Internet: http://www.novell.com/documentation/oes2/stor_dst_lx/?page=/documentation/oes2/stor_dst_lx/data/ba2iglh.html, (Nov. 9, 2009).

"Zamzar—Free Online Conversion", [Online] Retrieved from the Internet: http://www.zamzar.com/tools/, 1-2.

* cited by examiner

TECHNIQUES FOR DYNAMIC DISK PERSONALIZATION

This application is a continuation of U.S. patent application Ser. No. 14/025,430, filed on Sep. 12, 2013, which is a continuation of U.S. patent application Ser. No. 13/400,224, filed on Feb. 20, 2012, now issued as U.S. Pat. No. 8,539,136, which is a continuation of U.S. patent application Ser. No. 12/706,813, filed on Feb. 17, 2010, now issued as U.S. Pat. No. 8,140,735, all of which are incorporated herein by reference in their entireties.

BACKGROUND

Increasingly, services and communication are achieved over the Internet and the World-Wide Web (WWW). Geographical location is becoming irrelevant with respect to network connectivity. Furthermore, the physical devices used by individuals to communicate and conduct business are increasingly becoming transparent through machine virtualization techniques and miniaturized.

As the industry uses more and more virtualization, there exists a problem on how the changes made by the end user are saved and restored. The end user may start out with a standard virtual machine (VM) image but as soon as a new program is added, some programs are run or files are saved, the image must be saved as an entirely new image or the changes will be lost if the user ends and restarts the user's VM. A user can map a personal disk to the running VM image and use it for all changes and installs, but this does not solve the problem. The reason for this is that when software is installed or runs it is common for the software to write to the root/boot drive. Writing to the root drive changes the base image, such that the base image must now be saved as a new image. This entire process can consume large amounts of storage/disk and add a required step to the end user. The described situation also adds new ways to lose data, time, and disk space.

An example of this would be if the user installs a new application such as Word® to a mapped drive such as "N:" on a running instance of a VM such as "Standard_Win32_image." Drive N: is mapped to a personal storage drive for the user; it could be a local drive, a network drive, or a cloud drive such as "S3" via Amazon®. As Word® is installed the code is copied to drive "N:," which does not change the base image but as part of the install several files are also added or modified on the default ROOT. One of these files is the Window's® Registry. The Window's® Registry is a part of the "Standard_Win32_image" and is now changed by the user. After the install of Word® and as the user runs the Word® application, the registry continues to change as the user does any thing that Word® is configured to "remember."

This example of using and installing Word® is just one simple case of how the VM image can be changed by the user and need to be saved as a new image. As the industry moves into a Virtual Desktop Infrastructure (VDI), the problem of having many personal images will become a major storage and management problem.

SUMMARY

In various embodiments, techniques for dynamic disk personalization are presented. More specifically, and in an embodiment, a method for dynamically personalizing a disk within a Virtual Machine (VM) is provided. A request is intercepted from a principal to access storage; the request is received within a VM. The VM is defined as an instance of a virtual image. The request is then redirected to an external data store that is external to the virtual image. Finally, instructions are received from the external data store identifying a location for data that satisfies the request.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "virtual machine" (VM) may be viewed as a logical processing environment overlaid or superimposed on a physical device. The VM is a logical machine that is independent of its physical process environment or physical machine. It may include its own operating system (OS), its own file system (FS), its own directory services, etc., which may each be different from the physical processing environment.

A "virtual image" is a specific instance of a VM. That is, the virtual image is the configuration data that when processed becomes an executing instance of a VM. The virtual image creates or instantiates a specific VM.

Various embodiments of this invention can be implemented in existing network architectures. For example, in some embodiments, the techniques presented herein are implemented in whole or in part in the Novell® operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
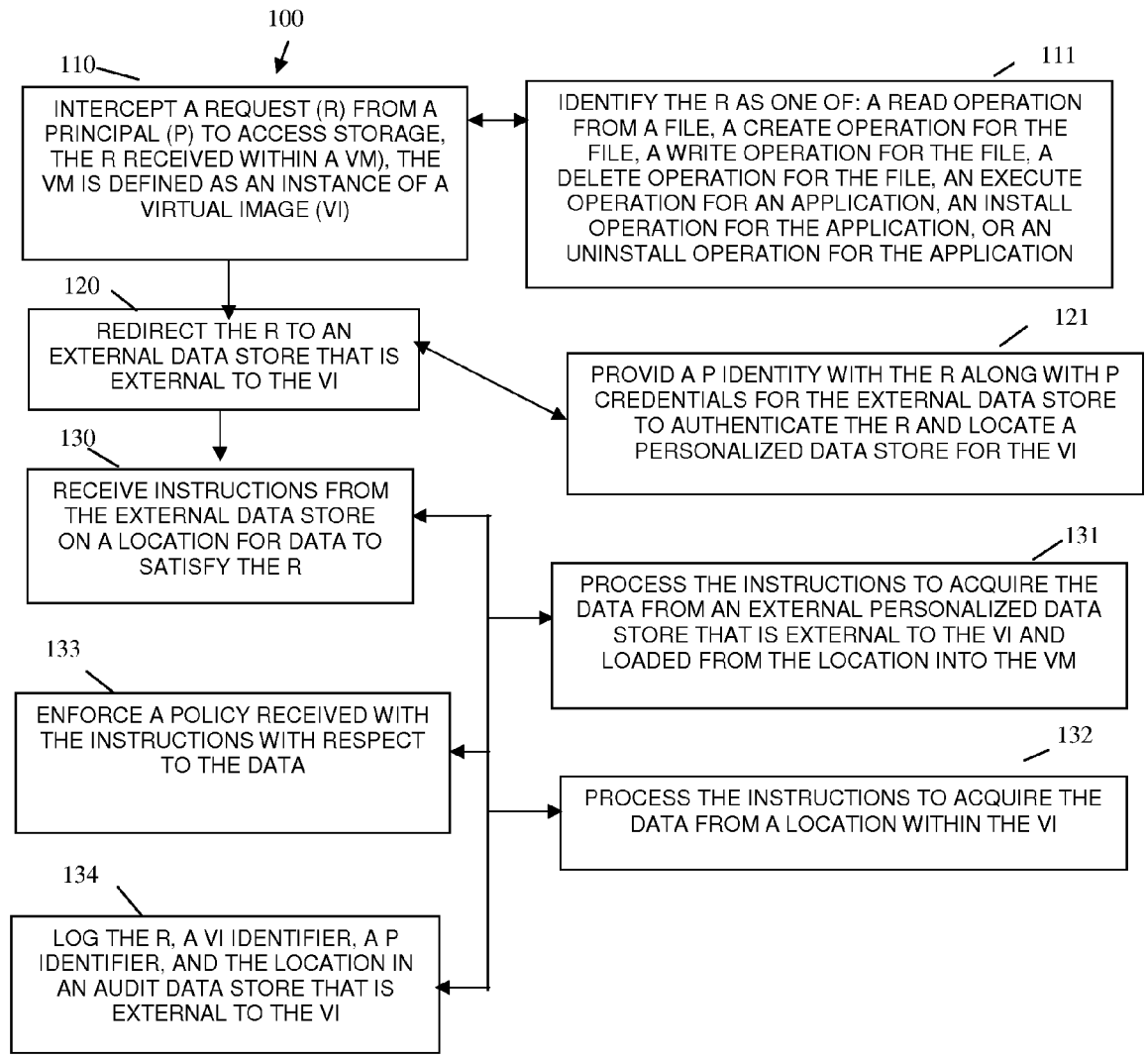
FIG. 1 is a diagram of a method for dynamically personalizing a disk within a VM, according to an example embodiment.
Figure 2:
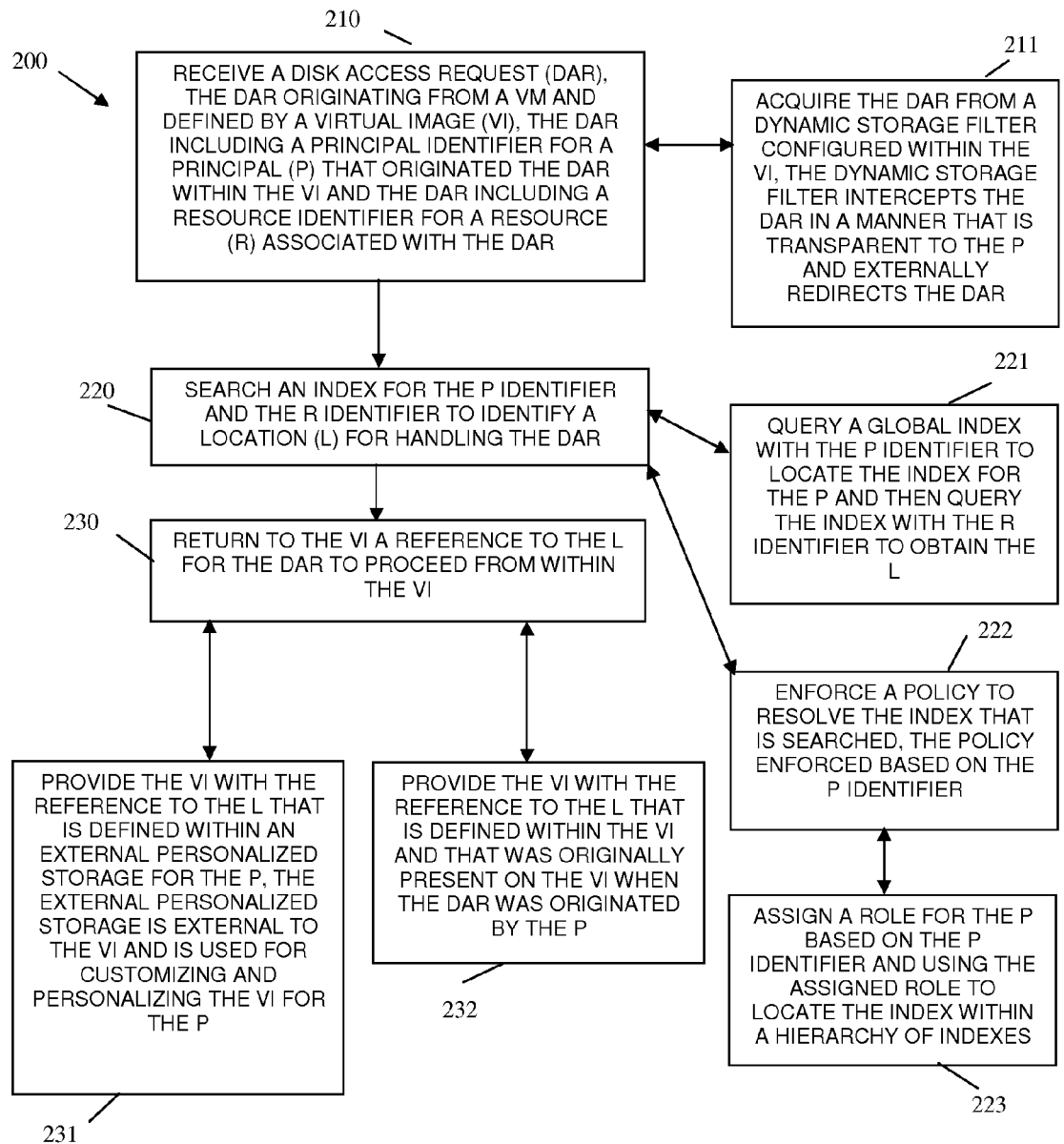
FIG. 2 is a diagram of another method for dynamically personalizing a disk within a VM, according to an example embodiment.
Figure 3:
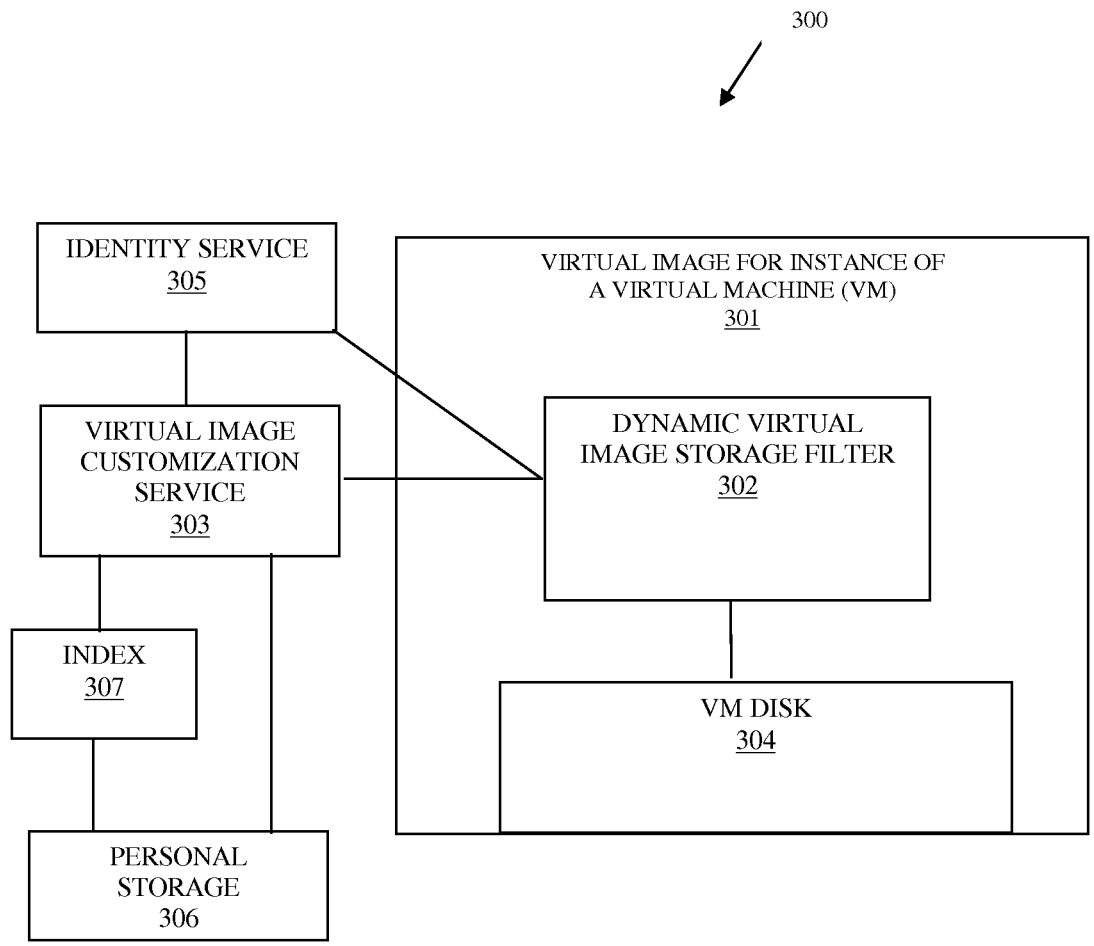
FIG. 3 is a diagram of a dynamic VM disk personalization system, according to an example embodiment.

It is within this context that embodiments of the invention are now discussed within the context of FIGS. 1-3.

FIG. 1 is a diagram of a method 100 for dynamically personalizing a disk within a VM, according to an example embodiment. The method 100 (hereinafter "VM disk personalization service") is implemented in a machine-accessible and computer-readable medium and instructions that execute on one or more processors (machines, computers, processors, etc.). The machine is specifically configured to process the VM disk personalization service. Furthermore, the VM disk personalization service is operational over and processes within a network. The network may be wired, wireless, or a combination of wired and wireless.

According to an embodiment, the VM disk personalization service is provided from the perspective of a dynamic storage filter service that is implemented within a virtual image and carried as a service that initiates when a VM for the virtual image is started. So, the processing of the VM disk personalization service is embedded within a VM and a virtual image that defines the VM.

At 110, the VM disk personalization service intercepts a request from a principal (user or automated service executing within the VM) to access storage. The request is received from within an executing VM and that VM is defined as an instance of a virtual image.

According to an embodiment, at 111, the VM disk personalization service identifies the request as one or more of: a read operation for a file, a created operation for the file, a write operation for the file, a delete operation for the file, an execute operation for an application, an install operation for an application, and/or an uninstall operation for the application. It is noted that a single request, such as an execute operation can generate multiple different types of disk access operations, such as read, write, delete, and the like. So, it is noted that a single request can include or cause to initiate multiple disk operations within the VM.

At 120, the VM disk personalization service redirects the request to an external data store that is external to the virtual image defining the VM. So, the request is not immediately satisfied by accessing the virtual disk or storage of the VM; rather, the request is redirected to an external data store and an external service for novel processing (as described herein and below). Thus, the VM disk personalization service acts as a type of transparent proxy within the VM, where all VM disk access operations are intercepted (110) and redirected to an external service for handling (120).

In an embodiment, at 121, the VM disk personalization service provides a principal identity with the request along with principal credentials for the external data store or external service to authenticate the request and locate a personalized data store for the virtual image and the principal. That is, the external data store or external service may handle requests from multiple different principals and instances of VM's, such that the principal identity provides a mechanism for enforcing and ensuring authentication and security.

At 130, the VM disk personalization service receives instructions from the external data store or external service (hereinafter "external data store") with respect to a location where data resides to satisfy the request. It is noted that the location may be all that is needed when a write request is occurring with the request and in such a case the request will actually carry the write data to store at the location.

In an embodiment, at 131, the VM disk personalization service processes the instructions to acquire the data from an external personalized data store, which is external to the virtual image and which is loaded from the location into the VM.

In another situation, at 132, the VM disk personalization service processes the instructions to acquire the data from a location within the virtual image that defines the VM. Here, the actual request could have been satisfied originally from the VM via the existing virtual image for that VM, but the instructions for acquiring the data had to come from the external data store that handles all disk access operations within the VM.

In yet another case, at 133, the VM disk personalization service enforces a policy received with the instructions with respect to the data. So, security such as access rights and other limitations can be enforced against the data via a configured policy.

In still more scenarios, at 134, the VM disk personalization service logs the request, a virtual image identifier (and/or VM identifier), a principal identifier, and/or the location for the data in an audit data store that is external to the virtual image. So, an audit mechanism can be integrated into the processing of the VM. Audits and reports can subsequently be generated to ensure usage of the VM comports with enterprise policy and/or to identify performance bottlenecks of the VM.

FIG. 2 is a diagram of another method 200 for dynamically personalizing a disk within a VM, according to an example embodiment. The method 200 (hereinafter "disk personalization service") is implemented in a machine-accessible and computer-readable storage medium as instructions that execute on one or more processors of a network. The network may be wired, wireless, or a combination of wired and wireless. Furthermore, the processor (device having a processing instance of the disk personalization service) is specifically configured to process the disk personalization service.

The disk personalization service represents another aspect of the VM disk personalization service, represented by the method 100 of the FIG. 1. Specifically, the VM disk personalization service of the method 100 provides processing that occurs within a virtual image that defines an instance of a VM whereas the disk personalization service represents processing of the external data store or external service discussed above with respect to the method 100. That is, the disk personalization service processes external to a VM and its image. So, the processing of disk personalization service is independent of any particular virtual image defining any particular VM. The method 100 and the method 200 cooperate and interact with one another.

At 210, the disk personalization service receives a disk access request. The disk access request originates from a VM and is defined by a virtual image. Also, the disk access request includes a principal identifier that identifies a principal who originated the disk access request within the VM, and the disk access request includes a resource identifier for a resource associated with the disk access request, such as a file, an application, a disk drive, and the like.

According to an embodiment, at 211, the disk personalization service acquires the disk access request from a dynamic storage filter configured within the virtual image and initiated with the VM. The dynamic storage filter intercepts the disk access request in a manner that is transparent to the principal and externally redirects the disk access request to the disk personalization service. In a particular case, the dynamic storage filter is the method 100 discussed above with respect to the FIG. 1.

At 220, the disk personalization service searches an index for the principal identifier and the resource identifier for purposes of identifying a location for handling the disk access request. In an embodiment, the index is a database table that provides a database Application Programming Interface (API) for querying and managing the database table.

In an embodiment, at 221, the disk personalization service queries a global index with the principal identifier. The results of this query provide the disk personalization service with the index, which is personal to the principal. Once the index is acquired, the disk personalization service searches the index with the resource identifier to obtain the location that is to be used for handling the disk access request.

According to an embodiment, at 222, the disk personalization service enforces a policy to resolve the index that is to be searched. The policy is based on the principal identifier.

Continuing with the embodiment of 222 and at 223, the disk personalization service assigns a role for the principal based on the principal identifier. The assigned role is then used to locate the index within a hierarchy of available indexes. In this manner, there can be multiple levels of indexes that are hierarchically organized and policy and/or role or group assignments combined with identity can resolve the actual index that is used to perform the search. Each index is specific to a storage area where the disk access request is to be processed. Thus, in an enterprise environment a "development" group can include multiple specific users and those users are to have access to programs not available to managers. This can be achieved via a hierarchy of indexes, each index identifying a specific storage that is used to dynamically alter the virtual image at run time to provide the development users with access to their programs but the base virtual image for the developers and the managers remains the same. Because a hierarchy is achieved, personalization can also occur within the development group based on the user level (principal identity).

At 230, the disk personalization service returns to the virtual image a reference to the location for the disk access request to proceed from within the virtual image or VM. So, the data or a handle to the storage area for processing the disk access request is dynamically and in real time altered and passed to the VM via the disk personalization service.

In an embodiment, at 231, the disk personalization service provides the virtual image with the reference to the location where that location is defined within an external personalized storage that is personal or specific to the principal. So, the external personalized storage is external to the virtual image and is used for customizing and personalizing the virtual image for the principal. In other words, alterations and customizations that a user makes to their virtual image for their VM is recorded and noted in the external personalized storage and the disk personalization service ensures that these alterations and customizations are dynamically rendered and overlaid on the VM each time the user initiates the baseline virtual image.

It may also be the case, at 232, that the disk personalization service provides the virtual image with the reference to the location where that location is defined and available within the virtual image. So, the disk access operation is processed from a location that was originally present within the virtual image or VM, but it was the disk personalization service that made the decision to permit that processing to continue from within the VM and not from an external storage location.

The disk personalization service provides novel processing opportunities. An enterprise can maintain a single virtual image or sets of virtual images where each image is a baseline approved by the enterprise for support. Each user can then customize and add and remove programs as policy permits, but the baseline virtual images remain unchanged; what changes is the personalized storage for each user that is dynamically rendered each for a user to personalize each user's VM.

FIG. 3 is a diagram of a dynamic VM disk personalization system 300, according to an example embodiment. The dynamic VM disk personalization system 300 is implemented in a machine-accessible and computer-readable storage medium as instructions that execute on one or more processors (multiprocessor) and that is operational over a network. The one or more processors are specifically configured to process the components of the dynamic VM disk personalization system 300. Moreover, the network may be wired, wireless, or a combination of wired and wireless. In an embodiment, the dynamic VM disk personalization system 300 implements, inter alia, certain aspects of the methods 100 and 200 represented by the FIGS. 1 and 2, respectively.

The dynamic VM disk personalization system 300 includes a dynamic virtual image storage filter (DVISF) 302 and a virtual image customization service (VICS) 303. In some embodiments, the dynamic VM disk personalization system 300 also includes one or more of: an identity service 305, one or more personal storages 306, and/or one or more indexes 307. Each of these and their interactions with one another will now be discussed in turn.

The DVISF 302 is implemented in a computer-readable storage medium and is to execute on a processor within a VM 301. That is, the DVISF 302 is part of a virtual image that defines instances of the VM 301. Example processing associated with the DVISF 302 was provided in detail above with respect to the method 100 of the FIG. 1.

The DVISF 302 is configured to intercept disk access operations made within the VM 301. The DVISF 302 is also configured to redirect those disk access operations to the VICS 303. A principal that originates the disk access operations believes that the operations are being directed to the VM disk 304 of the VM 301 but this may not always be the situation since in some cases the operations are external to the VM 301 (as discussed herein above and below).

According to an embodiment, the DVISF 302 is configured as part of the virtual image for the VM 301. The DVISF 302 is configured to initiate and execute when the VM 301 is executed.

The VICS 303 is implemented in a computer-readable storage medium and is to execute on another processor that is external to the VM 301. Example processing associated with the VICS 303 was presented in detail above with reference to the method 200 of the FIG. 2.

The VICS 303 is configured to locate storage, resources, and data that satisfy the disk access operations. Moreover, the VICS 303 is configured to define for the DVISF 302 the mechanisms needed for processing the disk access operations within the VM 301 based on resolved locations for the storage, the resources, and the data.

In an embodiment, the VICS 303 is also configured to handle and process the disk access operations for the VM 301 and other disk access operations for multiple other VM's 301 of a network. So, the VICS 303 can handle an entire suite of VM's 301 of a network. In such a scenario, the VICS 303 may be implemented and processed on a server of the network.

In an embodiment, the dynamic VM disk personalization system 300 also includes an identity service 305. The identity service 305 is implemented in a computer-readable storage medium and is to execute on yet another processor of the network. Moreover, the identity service 305 is configured to interact with the VICS 303 and/or the DVISF 302 for purposes of providing authentication and security services when the VICS 303 attempts to locate the storage, the resources, and the data to satisfy the disk access operations.

In another scenario, the dynamic VM disk personalization system 300 includes a personalized storage 306 implemented in a computer-readable storage medium. The personalized storage 306 customized for a particular identity of a particular principal and the VICS 303 configured to access the personalized storage 306 when processing the disk access operations to personalize the VM 301 for the particular principal.

In another case, the dynamic VM disk personalization system 300 includes an index 307 (can be one or more indexes 307—hierarchy of indexes 307). The index 307 implemented in a computer-readable storage medium. The VICS 303 configured to search the index 307 to identify and to access specific areas of the personalized storage 306.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    detecting, by a processor, a request fir storage, the request made within a Virtual Machine (VM), wherein detecting further includes detecting the request within the VM; and
    filtering, by the processor, data obtained from the storage, where the storage is external to the VM and processing the data for customizing the VM, wherein filtering and processing further include filtering and processing from within the VM, and wherein detecting, filtering, and processing are processed when the VM is initiated.

2. The method of claim 1 further comprising, configuring, by the processor, policy with respect to the VM using the storage.

3. The method of claim 1 further comprising, obtaining, by the processor, metrics from the VM while the VM accesses the storage.

4. The method of claim 3 further comprising, identifying, by the processing, performance bottlenecks for accessing the storage based on evaluation of the metrics.

5. The method of claim 1, wherein detecting further includes identifying the VM as an instance of a VM image with multiple different instances distributed over a network.

6. The method of claim 1, wherein detecting further includes redirecting the request made within the VM to the storage that is an external storage device, the external storage device is external to the VM for processing the request.

7. The method of claim 1, wherein detecting further includes authenticating the request for access to the storage.

8. The method of claim 1, wherein filtering further includes customizing the VM based on an identity of a principal associated with the VM.

9. The method of claim 8, wherein customizing further includes customizing the VM based on an identity of an executable instance associated with the VM.

10. A method, comprising:
    identifying, by a processor, a request for storage for an instance of a Virtual Machine (VM) associated with a principal;
    obtaining, by the processor, the storage from a location that is external to the instance of the VM; and
    customizing, by the processor, the storage for access within the instance of the VM based on a principal identity associated with the principal, and wherein identifying; obtaining, and customizing are processed within the instance of the VM when the VM is initiated.

11. The method of claim 10, wherein identifying further includes detecting the request as being made from within the instance of the VM by the principal.

12. The method of claim 10, wherein obtaining further includes identifying a storage location for the storage based on an identifier for one or more of: the principal and the instance.

13. The method of claim 10, wherein customizing further includes filtering the storage based at least in part on the principal identity.

14. The method of claim 10, wherein customizing further includes enforcing access restrictions against the principal when the storage is accessed from within the instance.

15. The method of claim 10, wherein customizing further includes obtaining metrics when the storage is accessed from within the instance.

16. The method of claim 10, wherein customizing further includes auditing access to the storage when the storage is accessed from within the instance.

17. The method of claim 10 further comprising, providing, by the processor, the instance with a link to externally reference the storage from within the instance.

18. A system, comprising:
    a processor;
    a Virtual Machine (VM) filter configured and adapted to: i) execute on the processor, ii) intercept external storage requests made from within an instance of a VM when the VM is initiated on the processor, and iii) customize the external storage for access within the instance before access is granted to the instance, wherein the customization occurs when the VM is initiated on the process from within the VM.

19. The system of claim 18, wherein the VM filter is further adapted and configured to: iv) customize the external storage for access by multiple other independent and different instances of the VM, each customization based at least in part on: a principal associated with a particular instance and a particular instance.

* * * * *